United States Patent
Li et al.

(10) Patent No.: US 12,421,439 B2
(45) Date of Patent: Sep. 23, 2025

(54) DUAL-PURPOSE SACRIFICIAL ANTI-SWELLING AGENT, PREPARATION METHOD AND APPLICATION THEREOF

(71) Applicants: China University of Petroleum, Shandong (CN); China shi da Education Development Co., Ltd, Shandong (CN)

(72) Inventors: Binglin Li, Shandong (CN); Yuliang Su, Shandong (CN); Binfei Li, Shandong (CN); Chao Zhang, Shandong (CN); Qichao Lv, Shandong (CN)

(73) Assignees: China University of Petroleum, Dongying (CN); China shi da Education Development Co., Ltd, Qingdao (CN)

( * ) Notice: Subject to any disclaimer, the term of this patent is extended or adjusted under 35 U.S.C. 154(b) by 0 days.

(21) Appl. No.: 19/004,499

(22) Filed: Dec. 30, 2024

(65) Prior Publication Data

US 2025/0136858 A1 May 1, 2025

Related U.S. Application Data

(63) Continuation of application No. PCT/CN2024/081451, filed on Mar. 13, 2024.

(30) Foreign Application Priority Data

Oct. 27, 2023 (CN) .......................... 202311404708.9

(51) Int. Cl.
*C09K 8/575* (2006.01)
(52) U.S. Cl.
CPC .......... *C09K 8/575* (2013.01); *C09K 2208/12* (2013.01)
(58) Field of Classification Search
CPC .................... C09K 8/575; C09K 2208/12
See application file for complete search history.

(56) References Cited

U.S. PATENT DOCUMENTS 3,718,639 A * 2/1973 Falkehag .............. C08L 95/005
106/284.4
4,713,185 A 12/1987 Howard et al.

FOREIGN PATENT DOCUMENTS

| CN | 105013390 A | 11/2015 |
| CN | 107129177 A | 9/2017 |
| CN | 109468845 A | 3/2019 |

OTHER PUBLICATIONS

Notice of Allowance of counterpart Chinese Patent Application No. 202311404708.9 issued on Dec. 6, 2023.
First Search Report of counterpart Chinese Patent Application No. 202311404708.9 issued on Nov. 23, 2023.
Feng, Puyong et al., Evaluation of a novel bisquats clay stabilizer/sanding inhibiter and discussion on its mechanisms, China Offshore Oil and Gas, Jun. 2017, pp. 73-77, vol. 29, No. 3.
Liang, Xiao-Bing et al., Synthesis of Ammonium Polyether and Its Anti-swelling Property Evaluation in Acidification and Fracturing, Contemporary Chemical Industry, Jan. 2014, pp. 21-23, vol. 43, No. 1.

* cited by examiner

*Primary Examiner* — Aiqun Li

(57) ABSTRACT

A dual-purpose sacrificial anti-swelling agent, and a preparation method and application thereof are provided and relate to the technical field of oil reservoir exploitation. The dual-purpose sacrificial anti-swelling agent is quaternized lignin, a phenolic hydroxyl group of quaternized lignin is linked with two quaternary ammonium nitrogen atoms that are located at para positions of the same six-membered ring. Raw materials used in the present disclosure are prepared from papermaking waste liquid and a by-product of flue gas desulfurization and denitrification, which not only reduces the cost, but also transforms waste materials into valuable resources. The present disclosure increases the adsorption capacity of quaternized lignin in the formation by quaternizing lignin, and enables quaternized lignin to acts as both a sacrificial agent and an anti-swelling agent through competitive adsorption, achieving multiple purposes by using one agent.

17 Claims, 1 Drawing Sheet

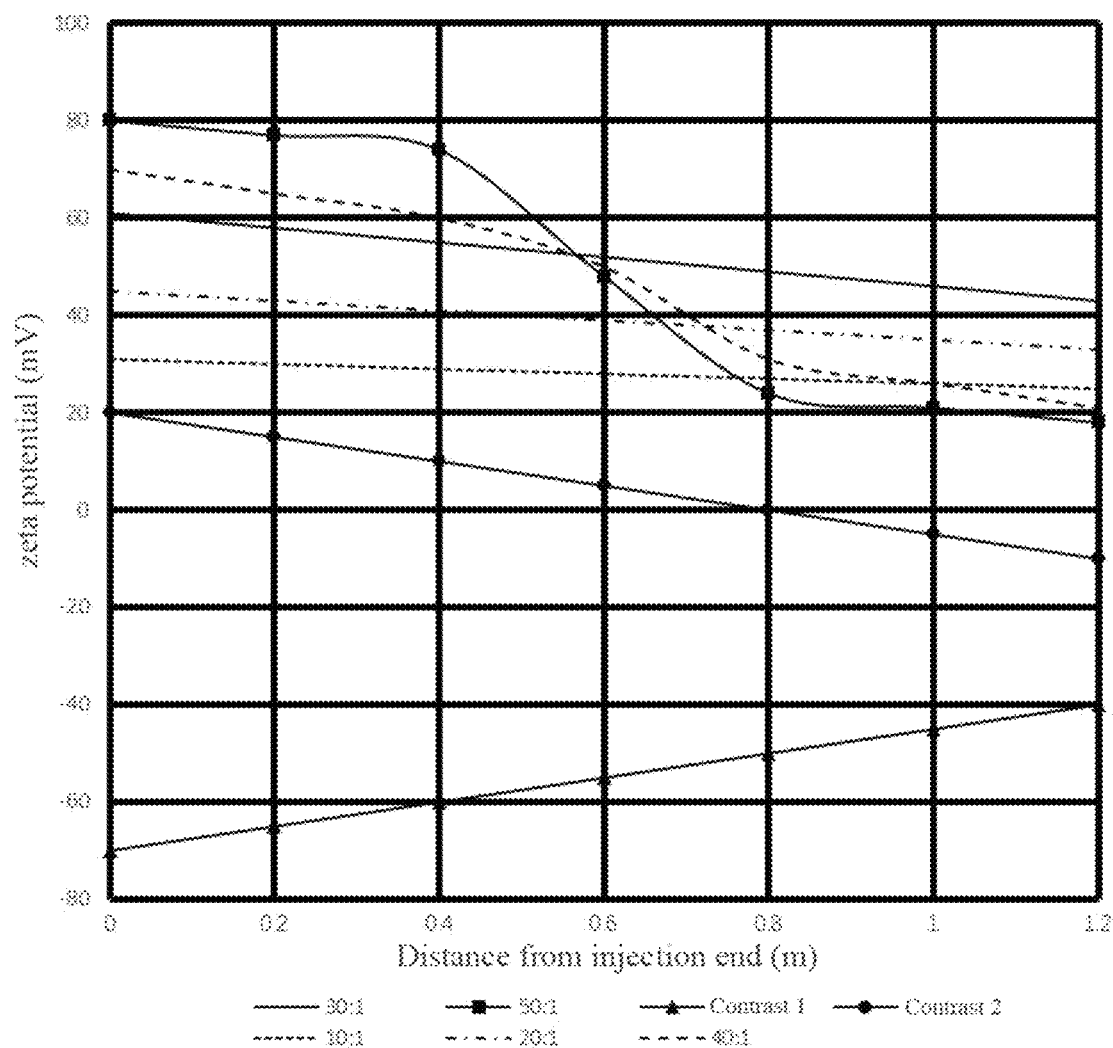

DUAL-PURPOSE SACRIFICIAL ANTI-SWELLING AGENT, PREPARATION METHOD AND APPLICATION THEREOF

CROSS-REFERENCE TO RELATED APPLICATIONS

The present application is a continuation application of PCT application No. PCT/CN2024/081451 filed on Mar. 13, 2024, which claims the benefit of Chinese Patent Application No. 202311404708.9 filed on Oct. 27, 2023. The contents of all of the aforementioned applications are incorporated by reference herein in their entirety.

FIELD OF THE INVENTION

The present disclosure relates to the technical field of oil reservoir exploitation, and specifically, to a dual-purpose sacrificial anti-swelling agent, and a preparation method and application thereof.

BACKGROUND OF THE INVENTION

Shale oil reservoirs contain abundant clay minerals, which are prone to hydration swelling, causing migration of mineral particles, blocking of effective pore throats, and reduction of permeability of the effective pore throats. Anti-swelling agents for clay are adsorbed onto the reservoir surface to prevent clay from hydration swelling. Common anti-swelling agents for clay include inorganic salts, organic cations, and the like. The inorganic salt anti-swelling agents, such as potassium chloride (KCl), are cheap and readily available, but are easily desorbed from reservoirs and have weak adsorption effects, making them unsuitable for long-term swelling prevention. The organic cation anti-swelling agents are linked with a large number of adsorption groups, which can form bridges between clay mineral layers, as well as particles. Therefore, they are not easily washed away by the fluid in reservoirs, can act for a long time, but are expensive.

In addition, during improvement of recovery and fracturing, sacrificial agents preferentially occupy adsorption sites on reservoirs and thus may alleviate the adsorption of surfactants and polymers on the reservoirs. Common sacrificial agents include lignosulfonates, alkali lignin, and the like. However, conventional lignin compounds exhibit limited adsorption capacity on reservoirs. Although organic cations are more effective sacrificial agents due to their strong adsorption capacity and competitive adsorption with oil displacing agents, their high cost prevents their effective use as sacrificial agents.

Based on the above, the use of organic cations as anti-swelling agents or sacrificial agents suffer from high costs. While an inorganic salt used as an anti-swelling agent and lignin used as a sacrificial agent are more cost-effective, their limited adsorption capacity reduces their overall effectiveness. Therefore, it is necessary to reduce the cost of organic cations, and improve the effects of anti-swelling agents and sacrificial agents through competitive adsorption.

SUMMARY OF THE INVENTION

An objective of the present disclosure is to provide a dual-purpose sacrificial anti-swelling agent, and a preparation method and application thereof, in order to overcome the foregoing deficiencies in the prior art. Raw materials of the dual-purpose sacrificial anti-swelling agent, that is, lignin and a quaternizing agent, are prepared from papermaking waste water and a by-product of flue gas treatment, which effectively reduce the cost. Moreover, by introducing two quaternary ammonium atoms into a phenolic hydroxyl group of lignin, a lignin quaternary ammonium salt has the functions of both an anti-swelling agent and a sacrificial agent, realizing effective protection of reservoirs.

In order to achieve the foregoing technical effects, the present disclosure adopts the following technical solutions.

The present disclosure provides a dual-purpose sacrificial anti-swelling agent, which is quaternized lignin. A phenolic hydroxyl group of quaternized lignin is linked with two quaternary ammonium nitrogen atoms that are located at para positions of the same six-membered ring.

Preferably, a chemical formula of the dual-purpose sacrificial anti-swelling agent is as follows:

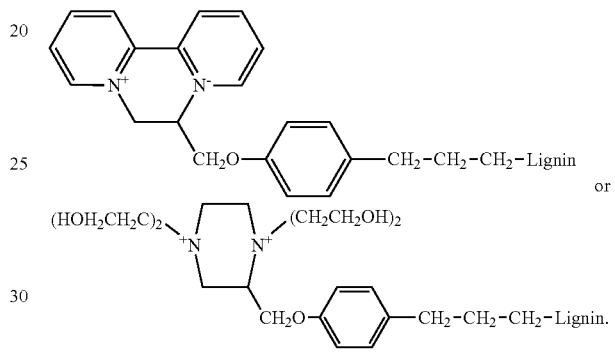

The present disclosure further provides a preparation method of the foregoing dual-purpose sacrificial anti-swelling agent, which includes the following steps:

S1: preparation of a quaternizing agent: adding a flue gas desulfurization and denitrification product and epichlorohydrin to dimethylformamide (DMF), heating, and raising the temperature for reflux to obtain a quaternizing agent; and S2: quaternization of lignin: adding LiOH and a mixed solution of tetrahydrofuran and water to an alkali lignin solution, stirring, performing heating reflux, adding the quaternizing agent prepared in S1, reacting, and treating to obtain a dual-purpose sacrificial anti-swelling agent.

The flue gas desulfurization and denitrification product is any one of a sulfate of THEED, a nitrate of THEED, a sulfate of bipy, and a nitrate of bipy.

Lignin and the quaternizing agent used in the present disclosure are prepared from papermaking waste liquid and a flue gas desulfurization and denitrification product, respectively, which not only reduces the cost, but also transforms waste materials into valuable resources.

In the prior art, flue gas desulfurization and denitrification by-products, such as sulfates and nitrates, are mostly discarded directly, or used as raw materials for preparation of chemical fertilizers and daily chemical products. However, an overall utilization rate is not high. The present disclosure provides a new method for recycling by-products. According to the method, by-products are used for preparation of a quaternizing agent, not only the by-products of flue gas desulfurization and denitrification are effectively used, but also the preparation cost of a lignin quaternary ammonium salt is significantly reduced Therefore, quaternized lignin can be used as a sacrificial anti-swelling agent and widely applied to exploitation of oil reservoirs.

Preferably, in S1, a molar ratio of the flue gas desulfurization and denitrification product to epichlorohydrin is (0.9-1.1): 1, and further preferably, 0.95:1.

Preferably, in S1, the heating temperature is 45° C., and the heating time is 1 h.

Preferably, in S1, the reflux temperature is 100-250° C., and the reflux time is 1-3 h; and further preferably, the reflux temperature is 200° C., and the reflux time is 3 h.

Preferably, in S2, a molar ratio of alkali lignin to LiOH is (2-4): 1; and further preferably, 3:1.

Preferably, in S2, a volume ratio of tetrahydrofuran to water in the mixed solution is 6:1.

Preferably, in S2, a volume ratio of the mixed solution to the alkali lignin solution is 4:1.

Preferably, in S2, the stirring time is 0.5 h, and a stirring speed is 200 rpm.

Preferably, in S2, the heating reflux temperature is 70° C., and the heating reflux time is 1 h.

Preferably, in S2, a molar ratio of the quaternizing agent to alkali lignin is (10-50): 1, and the reaction time is 72 h; and further preferably, the molar ratio of the quaternizing agent to alkali lignin is 30:1.

Preferably, in S2, the treating includes the following steps:
  desalting with a ceramic nanofiltration membrane with a pore size of 1-5 nm, removing tetrahydrofuran by rotary evaporation, washing residues with water, extracting with chloroform, removing tetrahydrofuran by rotary evaporation, and crystallizing with heptane to obtain a dual-purpose sacrificial anti-swelling agent.

The present disclosure further provides application of the foregoing dual-purpose sacrificial anti-swelling agent or a dual-purpose sacrificial anti-swelling agent prepared by the foregoing preparation method in exploitation of shale oil reservoirs.

Preferably, the application is specifically as follows: the dual-purpose sacrificial anti-swelling agent is prepared into an aqueous solution, and injected into a shale oil reservoir along an injection well; and further preferably, a mass concentration of the dual-purpose sacrificial anti-swelling agent in the aqueous solution is 1-5 wt %, and more preferably, 4 wt %.

The present disclosure has the following beneficial effects:
(1) Raw materials used in the present disclosure are prepared from papermaking waste liquid and a flue gas desulfurization and denitrification by-product, which not only reduces the cost, but also transforms waste materials into valuable resources.
(2) The present disclosure increases the adsorption capacity of quaternized lignin in the formation by quaternizing lignin, and enables quaternized lignin to act as both a sacrificial agent and an anti-swelling agent through competitive adsorption, achieving multiple purpose by using one agent.

BRIEF DESCRIPTION OF THE DRAWINGS

The sole figure is a diagram of a core zeta potential distribution comparison result of examples.

DETAILED DESCRIPTION OF THE EMBODIMENTS

The present disclosure will be further described below with reference to embodiments and drawings.

It is to be noted that experimental methods in the following embodiments are conventional methods unless otherwise specified; and reagents, materials, and equipment are commercially available unless otherwise specified.

Used experimental methods are as follows:
1. Test method for anti-swelling rate: the centrifugal anti-swelling rate and long-term anti-swelling performance are tested according to Performance Evaluation Method of Clay Stabilizer for Fracturing, Acidizing and Water Injection in Oil and Gas Fields (SY/T 5971-2016). A higher measured anti-swelling rate indicates better anti-swelling performance.
2. Test method for displacing agent adsorption capacity: the displacing agent adsorption capacity is tested by referring to a static adsorption experiment provided in the specific implementation of the patent CN105013390A. A lower measured displacing agent adsorption capacity indicates better sacrificial performance.

Example 1

A dual-purpose sacrificial anti-swelling agent was quaternized lignin, and a phenolic hydroxyl group of quaternized lignin was linked with two quaternary ammonium nitrogen atoms that were located at para positions of the same six-membered ring.

Specifically, a chemical formula of the dual-purpose sacrificial anti-swelling agent was as follows:

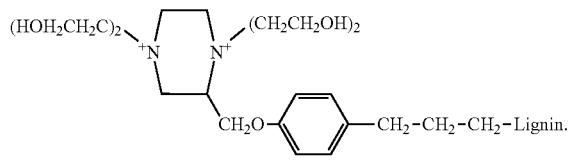

A preparation method of the foregoing dual-purpose sacrificial anti-swelling agent included the following steps:
S1: preparation of a quaternizing agent: a sulfate of THEED and epichlorohydrin in a molar ratio of 0.95:1 were added to dimethylformamide (DMF), and the solution was heated at 45° C. for 1 h, and refluxed at 200° C. for 3 h to obtain a quaternizing agent; and
S2: quaternization of lignin: LiOH was added to 17.5 mL of alkali lignin solution in a molar ratio of alkali lignin to LiOH of 3:1, 60 mL of tetrahydrofuran and 10 mL of water were added to the foregoing solution, and the solution was stirred at 200 rpm for 0.5 h, and heated to 70° C. and refluxed for 1 h. The quaternizing agent prepared in S1 was added in a molar ratio of the quaternizing agent to alkali lignin of 30:1, and the solution reacted for 72 h, and was desalted with a ceramic nanofiltration membrane with a pore size of 1 nm. After reaction, tetrahydrofuran was removed by rotary evaporation, residues were washed with water and extracted with chloroform, tetrahydrofuran was removed by rotary evaporation, and residues were crystallized with heptane to obtain a dual-purpose sacrificial anti-swelling agent.

Example 2

A dual-purpose sacrificial anti-swelling agent with the same chemical formula as that of Example 1 was provided in this example, and a difference between Example 1 and this example was that: in the preparation method, a nitrate of THEED was used in S1, a molar ratio of the nitrate of THEED to epichlorohydrin was 1.1:1, the reflux temperature was 100° C., and the reflux time was 1 h; and in S2, a molar ratio of alkali lignin to LiOH was 2:1, and a molar ratio of a quaternizing agent to alkali lignin was 10:1. Other preparation steps of this example were the same as those of Example 1.

Example 3

A dual-purpose sacrificial anti-swelling agent with the same chemical formula as that of Example 1 was provided in this example, and a difference between Example 1 and this example was that: in the preparation method, a nitrate of THEED was used in S1, a molar ratio of the nitrate of THEED to epichlorohydrin was 0.9:1, the reflux temperature was 250° C., and the reflux time was 2 h; and in S2, a molar ratio of alkali lignin to LiOH was 4:1, and a molar ratio of a quaternizing agent to alkali lignin was 50:1. Other preparation steps of this example were the same as those of Example 1.

Example 4

A dual-purpose sacrificial anti-swelling agent was quaternized lignin, and a phenolic hydroxyl group of quaternized lignin was linked with two quaternary ammonium nitrogen atoms that were located at para positions of the same six-membered ring.

Specifically, a chemical formula of the dual-purpose sacrificial anti-swelling agent was as follows:

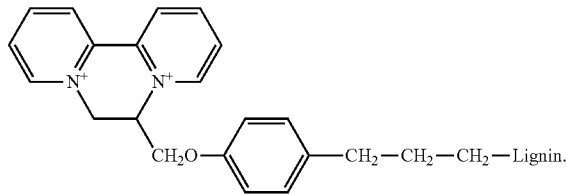

A preparation method of the foregoing dual-purpose sacrificial anti-swelling agent included the following steps:
S1: preparation of a quaternizing agent: a nitrate of bipy and epichlorohydrin in a molar ratio of 0.95:1 were added to DMF, and the solution was heated at 45° C. for 1 h, and refluxed at 200° C. for 3 h to obtain a quaternizing agent; and
S2: quaternization of lignin: LiOH was added to 17.5 mL of alkali lignin solution in a molar ratio of alkali lignin to LiOH of 3:1, 60 mL of tetrahydrofuran and 10 mL of water were added to the foregoing solution, and the solution was stirred at 200 rpm for 0.5 h, and heated to 70° C. and refluxed for 1 h. The quaternizing agent prepared in S1 was added in a molar ratio of the quaternizing agent to alkali lignin of 30:1, and the solution reacted for 72 h, and was desalted with a ceramic nanofiltration membrane with a pore size of 1 nm. After reaction, tetrahydrofuran was removed by rotary evaporation, residues were washed with water and extracted with chloroform, tetrahydrofuran was removed by rotary evaporation, and residues were crystallized with heptane to obtain a dual-purpose sacrificial anti-swelling agent.

Example 5

A dual-purpose sacrificial anti-swelling agent with the same chemical formula as that of Example 4 was provided, and a difference between Example 4 and this example was that: in S1, a sulfate of bipy was used. Other preparation steps of this example were the same as those of Example 4.

Experiment 1

The dual-purpose sacrificial anti-swelling agents of Example 1 and Example 4, sodium lignin sulfonate (Contrast 1), and KCl (Contrast 2) were prepared into 4 wt % aqueous solutions. The anti-swelling rate and displacing agent adsorption capacity were tested by the foregoing experimental method 1 and experimental method 2. Measured data is shown in Table 1.

Sodium lignin sulfonate was purchased from Jinan Yanghai Environmental Protection Materials Co., Ltd.

TABLE 1

| | Measured Data | |
|---|---|---|
| | Displacing agent adsorption capacity/($\mu$g/g) | Anti-swelling rate/% |
| Example 1 | 320 | 81 |
| Example 4 | 330 | 79 |
| Contrast 1 | 410 | 55 |
| Contrast 2 | 670 | 61 |

It can be seen from the data in Table 1 that:
1. Contrast 1 adopts sodium lignin sulfonate as a sacrificial agent whose displacing agent adsorption capacity is 1.28 times that of Example 1 and 1.24 times that of Example 4. It indicates that lignin can be mostly adsorbed in a reservoir through electrostatic action after a phenolic hydroxyl group of lignin is quaternized, and performs competitive adsorption with a displacing agent to play the role of a sacrificial agent.
2. Contrast 2 adopts a single potassium salt KCl as an anti-swelling agent whose anti-swelling rate is 75.3% of that of Example 1 and 77.2% of that of Example 2. It indicates that the dual-purpose sacrificial anti-swelling agent of the present disclosure can better prevent migration and swelling of clay particles.
3. The dual-purpose sacrificial anti-swelling agent of Example 1 has more hydroxy groups, and thus can be better adsorbed in the formation, achieving a better effect compared to Example 4. Therefore, the displacing agent adsorption capacity of Example 1 is slightly lower than that of Example 4, and the anti-swelling rate of Example 1 is slightly higher than that of Example 4. The performance of the dual-purpose sacrificial anti-swelling agent of Example 1 is better than that of Example 4.

Experiment 2

I. Experimental objective: an effect of a molar ratio of a quaternizing agent to alkali lignin on the performance of a dual-purpose sacrificial anti-swelling agent was studied.

II. Preparation of a dual-purpose sacrificial anti-swelling agent: based on Example 1, dual-purpose sacrificial anti-swelling agents were prepared by changing the molar ratio of the quaternizing agent to alkali lignin in S2, and other steps were the same as those of Example 1.

III. Experimental method: the anti-swelling rate and displacing agent adsorption capacity of each dual-purpose sacrificial anti-swelling agent were tested by the foregoing experimental method 1 and experimental method 2, and zeta potential of each point in the core was measured. A measurement method for zeta potential was as follows:

a 1.2 m core barrel was taken, a zeta potential probe was arranged every 0.2 m in the core barrel, a total of seven probes were arranged, an aqueous solution of each dual-purpose sacrificial anti-swelling agent was injected into the core barrel via one end, and zeta potential at this point was measured by the zeta potential probe.

IV. Experimental results: results are shown in Table 2.

TABLE 2

Effect of a molar ratio of a quaternizing agent to alkali lignin on the performance of a dual-purpose sacrificial anti-swelling agent

| Molar ratio of quaternizing agent to alkali lignin | Displacing agent adsorption capacity/(μg/g) | Anti-swelling rate/% |
| --- | --- | --- |
| 10:1 | 395 | 65 |
| 20:1 | 365 | 73 |
| 30:1 | 320 | 81 |
| 40:1 | 325 | 82 |
| 50:1 | 330 | 82 |

It can be seen from the data in Table 2 that in a case that the molar ratio of the quaternizing agent to alkali lignin is 30:1, the performance of the dual-purpose sacrificial anti-swelling agent is the optimal. As show in the sole figure, in a case that the molar ratio of the quaternizing agent to alkali lignin is greater than 30:1, more phenolic hydroxyl groups in alkali lignin are amidated, and thus, the dual-purpose sacrificial anti-swelling agent carries a large number of positive charges and is rapidly adsorbed in an immediate vicinity of wellbore to compress a diffused double layer of the immediate vicinity of wellbore. In this way, the dual-purpose sacrificial anti-swelling agent cannot effectively migrate to an area away from wellbore, resulting in significant reduction of zeta potential in the area away from wellbore. As the molar ratio is continuously increased, the anti-swelling effect is improved slightly, but the displacing agent adsorption capacity is increased slightly. In a case that the molar ratio of the quaternizing agent to alkali lignin is smaller than 30:1, as the molar ratio is decreased, the prepared dual-purpose sacrificial anti-swelling agent carries fewer and fewer positive charges, resulting in lower and lower adsorption capacity in the formation. Therefore, the anti-swelling rate is reduced, but the displacing agent adsorption capacity is increased.

Experiment 3

I. Experimental objective: an effect of the mass concentration of a dual-purpose sacrificial anti-swelling agent in an injected solution on the sacrificial and anti-swelling performance was studied.

II. Preparation of a solution: based on Example 4, the dual-purpose sacrificial anti-swelling agent of Example 4 was prepared into aqueous solutions at different mass concentrations.

III. Experimental method: the anti-swelling rate and displacing agent adsorption capacity of each solution were tested by the foregoing experimental method 1 and experimental method 2.

IV. Experimental results: results are shown in Table 3.

TABLE 3

Relationship between mass concentration of a dual-purpose sacrificial anti-swelling agent and the sacrificial and anti-swelling performance

| Mass concentration of dual-purpose sacrificial anti-swelling agent/wt % | Displacing agent adsorption capacity/(μg/g) | Anti-swelling rate/% |
| --- | --- | --- |
| 1 | 400 | 64 |
| 2 | 370 | 69 |
| 3 | 350 | 75 |
| 4 | 330 | 79 |
| 5 | 325 | 79 |

It can be seen from Table 3 that in a case that the mass concentration of the dual-purpose sacrificial anti-swelling agent is 4 wt %, the sacrificial and anti-swelling performance is the optimal. As the mass concentration is increased, the adsorption capacity of the dual-purpose sacrificial anti-swelling agent is increased, the anti-swelling rate is increased, and the displacing agent adsorption capacity is decreased due to competitive adsorption. However, in a case that the mass concentration is greater than 4 wt %, the adsorption capacity of the dual-purpose sacrificial anti-swelling agent tends to be saturated. As the mass concentration is increased, the anti-swelling rate is basically not increased, and the displacing agent adsorption capacity is basically not decreased. Based on the saturation adsorption observed in the shale core during experiments, the optimal mass concentration of the dual-purpose sacrificial anti-swelling agent is determined to be 4 wt %, considering both performance and economic cost factors.

Experiment 4

In 2021, an aqueous solution of the dual-purpose sacrificial anti-swelling agent of Example 1 at a mass concentration of 4 wt %, and an aqueous solution of CTAB were injected into a C-1 injection well and a C-2 injection well of J oil field. The foregoing two injection wells were located in the same shale oil reservoir, and the conditions of the two injection wells were the same. After injection, the displacing agent adsorption capacity was 330 g/g, and the anti-swelling rate was as high as 79%. The injection amount in the C-1 well was 25 m$^3$, and the injection cost was CNY 38,400.00. The injection amount in the C-2 well was 30 m$^3$, and the injection cost was CNY 600,000.00. Although the same effect is achieved, the cost of the dual-purpose sacrificial anti-swelling agent of the present disclosure is only 6.4% of the organic cation CTAB. Therefore, the present disclosure can reduce the cost of the dual-purpose sacrificial anti-swelling agent.

The invention claimed is:

1. A dual-purpose sacrificial anti-swelling agent, wherein characterized in that the dual-purpose sacrificial anti-swelling agent is a quaternized lignin, and a phenolic hydroxyl group of the quaternized lignin is linked with two quaternary ammonium nitrogen atoms that are located at para positions of the same six-membered ring; and a chemical formula of the dual-purpose sacrificial anti-swelling agent is as follows:

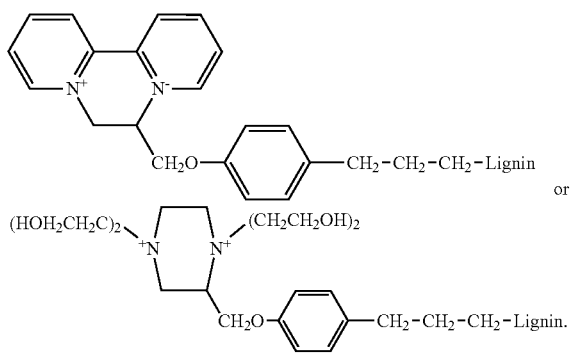

or

2. A preparation method of the dual-purpose sacrificial anti-swelling agent according to claim 1, comprising the following steps:
- S1: preparation of a quaternizing agent: adding a flue gas desulfurization and denitrification product and epichlorohydrin to dimethylformamide (DMF), heating, and raising the temperature for reflux to obtain a quaternizing agent; and
- S2: quaternization of lignin: adding LiOH and a mixed solution of tetrahydrofuran and water to an alkali lignin solution, stirring, performing heating reflux, adding the quaternizing agent prepared in S1, reacting, and treating to obtain the dual-purpose sacrificial anti-swelling agent,
- the flue gas desulfurization and denitrification product being any one of a sulfate of N,N,N',N'-Tetrakis(2-hydroxyethyl)ethylenediamine, a nitrate of N,N,N',N'-Tetrakis(2-hydroxyethyl)ethylenediamine, a sulfate of 2,2'-bipyridine, and a nitrate of 2,2'-bipyridine.

3. The preparation method according to claim 2, wherein, in step S1, a molar ratio of the flue gas desulfurization and denitrification product to epichlorohydrin is (0.9-1.1): 1.

4. The preparation method according to claim 2, wherein, in step S1, the heating temperature is 45° C., and the heating time is 1 h; and the reflux temperature is 100-250° C., and the reflux time is 1-3 h.

5. The preparation method according to claim 2, wherein, in step S2, a molar ratio of alkali lignin to LiOH is (2-4): 1.

6. The preparation method according to claim 2, wherein, in step S2, a volume ratio of tetrahydrofuran to water in the mixed solution is 6:1; and a volume ratio of the mixed solution to the alkali lignin solution is 4:1.

7. The preparation method according to claim 2, wherein, in step S2, the stirring time is 0.5 h, and a stirring speed is 200 rpm; and the heating reflux temperature is 70° C., and the heating reflux time is 1 h.

8. The preparation method according to claim 2, wherein, in step S2, a molar ratio of the quaternizing agent to alkali lignin is (10-50): 1, and the reaction time is 72 h.

9. A process of application of the dual-purpose sacrificial anti-swelling agent according to claim 1 to exploitation of a shale oil reservoir, wherein the dual-purpose sacrificial anti-swelling agent is injected into the shale oil reservoir.

10. A process of application of the dual-purpose sacrificial anti-swelling agent prepared by the preparation method according to claim 2 to exploitation of a shale oil reservoir, wherein the dual-purpose sacrificial anti-swelling agent is injected into the shale oil reservoir.

11. A process of application of the dual-purpose sacrificial anti-swelling agent prepared by the preparation method according to claim 3 to exploitation of a shale oil reservoir, wherein the dual-purpose sacrificial anti-swelling agent is injected into the shale oil reservoir.

12. A process of application of the dual-purpose sacrificial anti-swelling agent prepared by the preparation method according to claim 4 to exploitation of a shale oil reservoir, wherein the dual-purpose sacrificial anti-swelling agent is injected into the shale oil reservoir.

13. A process of application of the dual-purpose sacrificial anti-swelling agent prepared by the preparation method according to claim 5 to exploitation of a shale oil reservoir, wherein the dual-purpose sacrificial anti-swelling agent is injected into the shale oil reservoir.

14. A process of application of the dual-purpose sacrificial anti-swelling agent prepared by the preparation method according to claim 6 to exploitation of a shale oil reservoir, wherein the dual-purpose sacrificial anti-swelling agent is injected into the shale oil reservoir.

15. A process of application of the dual-purpose sacrificial anti-swelling agent prepared by the preparation method according to claim 7 to exploitation of a shale oil reservoir, wherein the dual-purpose sacrificial anti-swelling agent is injected into the shale oil reservoir.

16. A process of application of the dual-purpose sacrificial anti-swelling agent prepared by the preparation method according to claim 8 to exploitation of a shale oil reservoir, wherein the dual-purpose sacrificial anti-swelling agent is injected into the shale oil reservoir.

17. The process according to claim 9, wherein the the dual-purpose sacrificial anti-swelling agent is prepared into an aqueous solution at a mass concentration of 1-5 wt. %, and injected into the shale oil reservoir along an injection well.

* * * * *